March 29, 1949.  A. J. WISS  2,465,950
LIQUID TRANSFERENCE OF DICYCLOPENTADIENE
Filed July 16, 1946
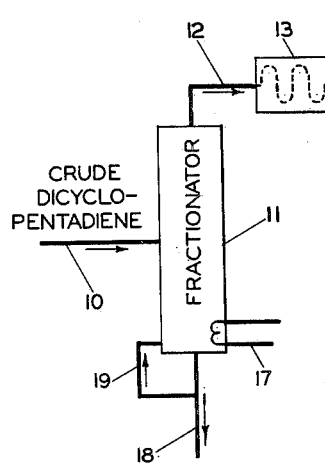
FIG. 1
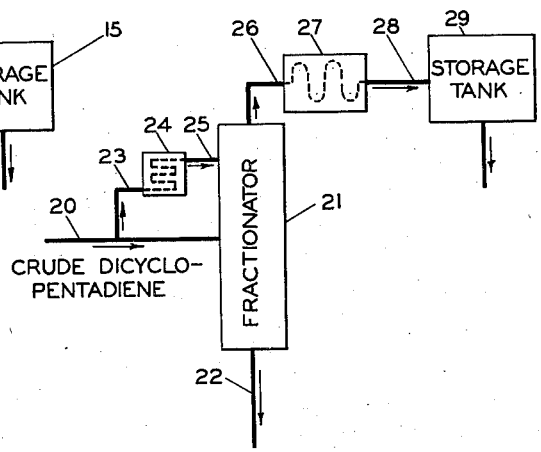
FIG. 2
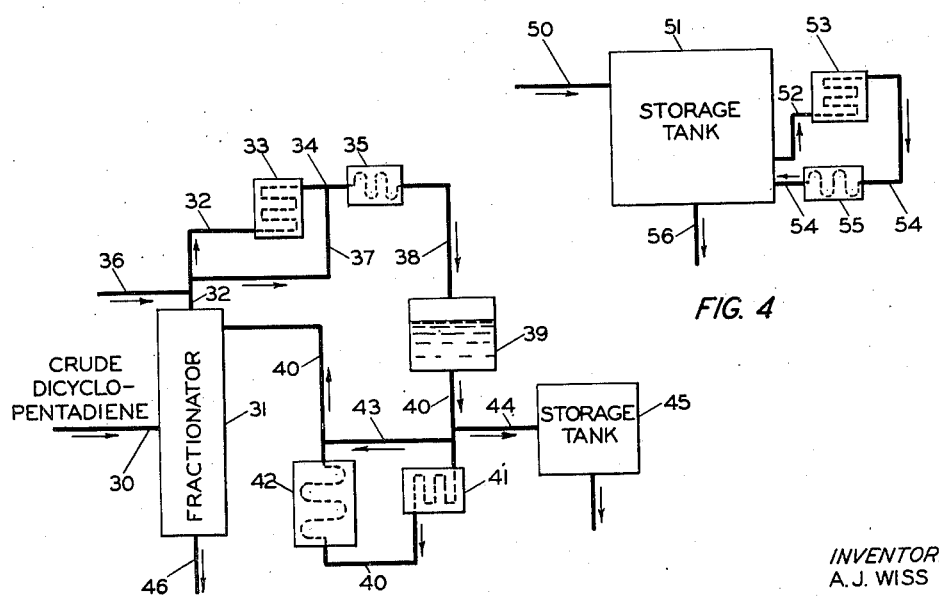
FIG. 3
FIG. 4
INVENTOR.
A. J. WISS
BY
Hudson and Young
ATTORNEYS Patented Mar. 29, 1949

2,465,950

UNITED STATES PATENT OFFICE 2,465,950

LIQUID TRANSFERENCE OF DICYCLOPENTADIENE

Adolph J. Wiss, Pana, Ill., assignor to Phillips Petroleum Company, a corporation of Delaware Application July 16, 1946, Serial No. 683,968

5 Claims. (Cl. 260—666)

This invention relates to the treatment of dicyclopentadiene. In a particular aspect the invention relates to a method of processing and handling dicyclopentadiene. In a specific embodiment, the invention relates to a method of transferring dicyclopentadiene conveniently in a liquid state at normal conditions of temperature and pressure.

Dicyclopentadiene is obtained in certain hydrocarbon fractions resulting as by-products of municipal gas, coal tar and petroleum industries. It is the fairly stable polymerized form of the increasingly important compound, cyclopentadiene. Dicyclopentadiene is stable at ordinary atmospheric conditions in the presence of an atmosphere of natural gas, nitrogen, or other atmosphere inert to the material, but readily decomposes at its normal boiling temperature of about 170° C. into the monomer form of cyclopentadiene, having a normal boiling point of about 42° C. The monomer, cyclopentadiene, is itself an important intermediate compound in the production of synthetic rubber, resins, and similar materials.

Cyclopentadiene polymerizes spontaneously, rapidly, and substantially exclusively to the dimer, i. e., dicyclopentadiene, under atmospheric conditions and, due to this strong tendency to polymerize, cyclopentadiene is usually handled commercially as dicyclopentadiene, which is a solid and is suitably stable for shipping at ordinary temperatures while at the same time, relatively easy to decompose into the more desirable monomer form.

In transferring or handling dicyclopentadiene at its destination and during processing it is often necessary and preferable to have the dimer in the liquid state. Since the melting point of pure dicyclopentadiene is about 33.6° C., handling of the dimer in liquid state requires the maintenance of all the equipment, conduits, etc. at a temperature above its melting point. At ordinary atmospheric temperatures the dimer is solid and thus will solidify and plug transfer lines and usual equipment which are not well insulated. Dissolution of the dimer in a solvent of lower freezing point is possible but not desirable since the purer the compound is, the more effective is the decomposition and recovery of cyclopentadiene and the more desirable is the resultant monomer for chemical conversions.

I have now found that dicyclopentadiene containing as much as 2 weight per cent cyclopentadiene freezes below room temperature and that by heating dicyclopentadiene under controlled conditions of time and temperature I obtain dicyclopentadiene containing a small proportion of cyclopentadiene, which lowers the freezing point sufficiently to allow transfer of the dicyclopentadiene in the liquid state at room temperature without the usual necessary insulation. Since any cyclopentadiene present may be easily polymerized to dicyclopentadiene, the presence of the cyclopentadiene is not objectionable and is particularly more desirable than a foreign solvent. Thus dicyclopentadiene containing only cyclopentadiene, especially in small amounts, may be said to be non-contaminated. Especially in the commercial uses mentioned above, dicyclopentadiene is always first converted to cyclopentadiene and thus the latter compound is merely some of the finally desired product and is certainly not a harmful impurity in the dicyclopentadiene stream.

It is therefore an object of this invention to prepare a body of dicyclopentadiene in the liquid state.

Another object of the invention is to maintain dicyclopentadiene in the liquid state at ordinary temperatures.

A further object is to treat a quantity of dicyclopentadiene to establish and maintain said compound in the liquid state under normal atmospheric conditions.

A still further object is to describe a process for preparing dicyclopentadiene in the liquid state for easy transfer in conventional equipment.

Another object is to describe a process for preparing liquid dicyclopentadiene containing a small beneficial amount of cyclopentadiene to maintain the liquid state under normal atmospheric conditions.

Other objects will be apparent to one skilled in the art from the accompanying disclosure and attached drawings.

Figure 1 illustrates one method of preparing a dicyclopentadiene-cyclopentadiene mixture of the desired proportions.

Figure 2 illustrates another method of preparing a dicyclopentadiene-cyclopentadiene mixture of the desired proportions.

Figure 3 shows a further method whereby the desired dicyclopentadiene-cyclopentadiene mixture may be prepared.

Figure 4 shows a method of preparing and maintaining dicyclopentadiene in the liquid state during storage.

As mentioned above, the presence of small amounts of cyclopentadiene in the dimer is not objectionable in the general use of the dimer.

I have found that the presence of at least 2 weight per cent, preferably of from 2 to 10 weight per cent, of cyclopentadiene is definitely an advantage in the usual processing of dicyclopentadiene since such mixtures are normally liquid and so more easily handled, particularly in transfer equipment, as brought out above. The change of freezing point as the percentage of dicyclopentadiene deviates from 100 weight per cent may be observed from the following table which gives the freezing points of several mixtures of dicyclopentadiene and cyclopentadiene:

Table I

| Composition of Mixture, wt. percent | | Freezing Point | |
| --- | --- | --- | --- |
| Dicyclopentadiene | Cyclopentadiene | °F. | °C. |
| 100 | 0 | 92.5 | 33.6 |
| 99 | 1 | 79.2 | 26.2 |
| 98 | 2 | 65.8 | 18.8 |
| 97 | 3 | 52.5 | 11.4 |
| 96 | 4 | 39.2 | 4.0 |
| 95 | 5 | 25.9 | −3.4 |

The preparation of suitable mixtures of dicyclopentadiene and cyclopentadiene may be accomplished in several ways, the most obvious being, of course, the simple operation of admixing the desired amount of cyclopentadiene from an external source to a quantity of dicyclopentadiene. However, a satisfactory mixture may be obtained by thermally treating dicyclopentadiene, itself, under such conditions that 2 to 10 weight per cent is converted to cyclopentadiene. For conversions in this range, temperatures of 250 to 400° F. and reaction times of 0.5 to 140 minutes are preferable. At temperatures substantially above 400° F., polymerization takes place, and below 250° F. the thermal conversion to cyclopentadiene is undesirably slow. The preferred conditions suitable for use in any specific instance are readily determined by trial and/or may be calculated from the following formula, discussed by Khambata and Wassermann, J. Chem. Soc., 1939, p. 375, in which $k$ is the velocity constant for the thermal conversion of the dimer to the monomer at a given temperature:

$$k = \frac{2.303}{t} \log \frac{a}{a-x}$$

in which $k$ = velocity constant;
$t$ = reaction time, seconds;
$a$ = initial concentration of dicyclopentadiene, weight per cent; and
$x$ = amount dicyclopentadiene converted, weight per cent.

The velocity constant, of course, varies for different temperatures of depolymerization. The constants at several different temperatures are given in Table II below:

Table II

| Temp., °F. | Vel. Const., $k$ |
| --- | --- |
| 250 | $1.10 \times 10^{-6}$ |
| 300 | $2.09 \times 10^{-5}$ |
| 325 | $8 \times 10^{-5}$ |
| 350 | $2.75 \times 10^{-4}$ |
| 400 | $2.47 \times 10^{-3}$ |

From the above data, it can be shown, for example, that when pure dicyclopentadiene is heated for about 10.6 minutes at 325° F., about 5 weight per cent is converted to cyclopentadiene, a mixture which freezes at 25.9° F., i. e., it is liquid at room temperature. Substantially no higher polymers are formed.

Since dicyclopentadiene is usually recovered from a crude mixture of organic compounds resulting from organic synthesis or decomposition of vegetable and petroleum oils, it is particularly advantageous to recover the compound in a normally liquid form by fractionation. Several methods by which dicyclopentadiene may be recovered with the desirable amount of cyclopentadiene may be described by reference to the accompanying figures, which illustrate several methods of preparing dicyclopentadiene-cyclopentadiene mixtures which are liquid and may be transferred to storage or further use under normal atmospheric conditions. In Figure 1, crude dicyclopentadiene, containing a substantial percentage of dicyclopentadiene, may be introduced by line 10 into a fractionator 11. Dicyclopentadiene is distilled overhead, as described below, and passes through line 12 to a condenser 13 in which the effluent vapors are liquefied. From the condenser the liquid is delivered by line 14 to further treatment or to storage in tank 15, as shown, from which it may be withdrawn as desired. The lower section of the fractionator contains a heating element 17 which may be regulated to maintain a temperature at least sufficient to convert 2 to 10 weight per cent of the dicyclopentadiene in the fractionator to cyclopentadiene. Under these conditions purified dicyclopentadiene, containing 2 to 10 weight per cent cyclopentadiene, may be withdrawn overhead. This overhead product will have a solidifying point below about 65° F. and will consequently be liquid under usual room temperature. The temperature in the bottom of the fractionating tower may be varied to raise or lower the extent of depolymerization and concentration of cyclopentadiene in the effluent, and thereby, the solidification point of the overhead effluent, as desired. Heavier impurities are removed from the fractionator through line 18 and, if desirable, a portion of the kettle product may be recycled to the fractionator by line 19 to promote the regulation of the temperature and extent of decomposition of the polymer to cyclopentadiene. Due to the tendency of dicyclopentadiene to decompose at its normal boiling point, it is preferred to employ sub-atmospheric pressure in the fractionator to allow the distillation of the major portion of dicyclopentadiene without decomposition. The pressure and temperature employed in the fractionator may be regulated mutually to produce effluent of the desired composition.

A modification of the fractionation is shown in Figure 2 where the charge of crude dicyclopentadiene is divided and a portion of the feed is introduced by line 20 into fractionator 21, which is preferably operated at subatmospheric pressure. Desired fractionation temperature to distill dicyclopentadiene overhead is maintained in the fractionation column by a heater (not shown) in the bottom of the column. Heavier products, such as tricyclopentadiene and higher polymers, collect in the bottom of the tower and may be removed by line 22. The second portion of the crude charge stock is conducted by line 23 to a heater 24 in which it is heated to 300 to 400° F. for 5 to 20 minutes to decompose a sufficient amount of the feed to cyclopentadiene so that, when admixed with the dicyclopentadiene vapors in the upper portion of the fractionator, the overhead effluent of the fractionator will contain from 2 to 10 weight per cent cyclopentadiene. The treated stream containing cyclopentadiene, is conducted from the heater through line 25 to the fractionator where it is preferably introduced at a point above the inlet of the untreated dicyclopentadiene stream. The effluent mixture distilling overhead through line 26 is conducted to a condenser 27 in which it is liquefied. From the condenser, the liquid dicyclopentadiene-cyclopentadiene mixture is directed by line 28 to further use or to storage in a tank 29, as shown. The amount of the crude stream withdrawn for depolymerization may be determined by trial and will depend upon the composition of the feed, the extent of depolymerization promoted in heater 24, and specific operating conditions.

Similarly, a charge of crude dicyclopentadiene may be purified in a system as illustrated in Figure 3 in which the feed may be introduced by line 30 into a fractionator 31. Heating means (not shown) is employed in the fractionating column to distill dicyclopentadiene, and necessarily any cyclopentadiene present, overhead from the column through line 32 to a heater 33. The effluent in line 32 is heated to a sufficient temperature and for a sufficient time, such as 300 to 400° F. for 5 to 20 minutes, to convert 2 to 10 weight per cent of the dicyclopentadiene to cyclopentadiene. The treated effluent from the heater is conducted by line 34 to a condenser 35 where the dicyclopentadiene-cyclopentadiene mixture is quickly cooled to about atmospheric temperature, at which temperature the mixture is liquid. Alternatively, if desired, any or all of the cyclopentadiene required to give the desired concentration in the fractionator effluent may be added through an inlet line 36. Also, any or all of the effluent mixture may be by-passed to the condenser through line 37, depending on the composition of the effluent vapors as they leave the fractionator, on the amount of cyclopentadiene supplied through line 36, and on the extent of depolymerization of any portion conducted through the heater 33. The various factors may be regulated in any combination of conditions which will furnish a mixed effluent comprising dicyclopentadiene which contains 2 to 10 weight per cent cyclopentadiene upon liquefaction in condenser 35. Soon after fractionation begins and during continuous operation, the composition of the fractionator effluent will be of the desired composition, as described below. During such time the desired effluent may be passed directly to the condenser through line 37. From the condenser the liquefied dicyclopentadiene is conducted by line 38 to an accumulator 39. From the accumulator a portion of the product may be returned to the fractionator as reflux through heater 41 and a cooler 42 in line 40. The product returned as reflux is treated in heater 41 under conditions similar to those in heater 33, above, to convert enough of the dicyclopentadiene to cyclopentadiene so that, on being returned to the upper section of the fractionator, the reflux will supply the cyclopentadiene necessary to give the desired composition in the effluent, i. e., 2 to 10 weight per cent cyclopentadiene. As desired, any part of the reflux being returned may by-pass the heater through line 43. Thus a relatively small part of the reflux may be highly depolymerized and remixed with the remainder of the reflux from line 43 or a larger part, or all, of the reflux may be conducted through the heater and treated so that the total reflux entering the fractionator will supply the required amount of cyclopentadiene. Purified dicyclopentadiene, containing 2 to 10 weight per cent cyclopentadiene, as desired, may be withdrawn from the system through line 44. The liquid dicyclopentadiene-cyclopentadiene mixture in line 44 may be transferred in ordinary conduits to some other immediate use or to storage in a tank 45, as shown, from which it may be withdrawn as desired. The preferred quantity of dicyclopentadiene recycled and the conditions of pretreatment before returning to the fractionation zone may be readily determined by trial. Heavier polymers and impurities may be withdrawn from the bottom of the fractionating column through line 46.

Figure 4 illustrates a method by which dicyclopentadiene containing sufficient cyclopentadiene to be liquid under ordinary conditions may be continuously maintained and supplied. Dicyclopentadiene of the desired composition may be introduced by line 50 into a retaining tank 51. In order to counteract the tendency of the cyclopentadiene to polymerize to dicyclopentadiene, a regulated portion of the material may be withdrawn through line 52 to a heater 53 in which sufficient depolymerization of the dicyclopentadiene conducted therethrough is effected to maintain the presence of 2 to 10 weight per cent of cyclopentadiene in the material in the tank. The effluent from the heater is returned to the tank by line 54. A cooler 55 in line 54 may be employed to cool the effluent from the heater to atmospheric temperature or to the temperature maintained in the storage tank. Liquid dicyclopentadiene may be withdrawn from the tank by line 56 as desired. The tank may preferably be equipped with a means, such as a stirrer, to keep the material agitated and substantially of uniform concentration throughout. If the dicyclopentadiene-cyclopentadiene mixtures produced in the distillations illustrated by the first three figures are to be maintained in storage for any time, the storage tanks may be equipped with the conditioning means of Figure 4.

Various valves, pumps, and other conventional equipment necessary to accomplish the present invention are omitted from the drawing for clarity of description. The first three figures illustrate three possible methods of assuring the desirable amount of monomer in the purified fractionator effluent, that is, by partial decomposition of the dicyclopentadiene in the fractionator itself, by partial decomposition of dicyclopentadiene in a portion of the crude material before it is charged to the fractionator, or by partial decomposition and recycle of a portion of the effluent product from the fractionation. Either of these modifications of the invention will produce a dicyclopentadiene-cyclopentadiene mixture of the required composition which will be liquid and capable of being transfered by means of conduits under normal atmospheric conditions. It will generally be preferable to conduct the fractionation at sub-atmospheric pressures, in any case, because of the tendency of dicyclopentadiene to decompose at its normal vaporization temperature.

In an example of a specific application of the invention, crude dicyclopentadiene, produced in a synthesis process and containing about 40 per cent dicyclopentadiene, may be introduced into the vacuum distillation column of a purification system as illustrated in Figure 3. The impurities, which are chiefly higher-boiling polymers, are drawn off from the bottom of the fractionating column. At the instigation of the distillation substantially all of the overhead product is conducted through the heater positioned ahead of the accumulator to immediately decompose a portion of the substantially pure dicyclopentadiene. All of the effluent is returned, through the second heater, to the fractionator as reflux until the overhead fraction begins being evolved with the desired composition so that the effluent will liquefy but not solidify upon cooling to atmospheric temperature. At this point the effluent from the fractionator is conducted directly to the condenser and a substantial proportion of desired product is withdrawn to storage. Another portion of the product is continually passed to the second heater where it is heated at about 350° F. to effect depolymerization and is cooled below the overhead temperature of the fractionator before being returned as reflux. The residence time in the heater, the feed rate of crude dicyclopentadiene to the column, and the reflux ratio are so correlated that the purified dicyclopentadiene withdrawn as the overhead effluent of the fractionator contains about 3 weight per cent cyclopentadiene and is, consequently, liquid at temperatures above about 53° F.

The example is illustrative only and is not intended to limit the scope of the invention. The proposed methods of fractionation may be varied in a number of ways individually, but are basically characteristic of the manner in which the desired dicyclopentadiene mixture may be prepared. Numerous applications of the invention will be obvious to one skilled in the art and various modifications may be made without departing from the spirit of the invention and the following claims in which it is intended to cover all novelty inherent in the invention.

I claim:

1. A process of recovering liquid, substantially non-contaminated dicyclopentadiene from a crude mixture containing dicyclopentadiene and heavier impurities, which comprises introducing said crude mixture into a fractionator, distilling a mixture of dicyclopentadiene and cyclopentadiene overhead, condensing said overhead mixture, treating a portion of said condensed overhead to partially depolymerize the dicyclopentadiene, returning the treated overhead portion as reflux to the fractionation to maintain the concentration of cyclopentadiene in said overhead between about 2 to 10 weight per cent, and withdrawing remaining condensed overhead as said liquid dicyclopentadiene.

2. A process according to claim 1 in which the portion of dicyclopentadiene to be depolymerized is heated between about 300 to 400° F. for from 5 to 20 minutes to effect said partial depolymerization.

3. A process of recovering and maintaining liquid, substantially non-contaminated dicyclopentadiene from a crude mixture containing dicyclopentadiene and heavier impurities, which comprises introducing said crude mixture into a fractionator; distilling a mixture of dicyclopentadiene and cyclopentadiene overhead; condensing said overhead mixture; treating a portion of said condensed overhead to partially depolymerize the dicyclopentadiene; returning the treated overhead portion as reflux to the fractionation to maintain the concentration of cyclopentadiene in said overhead between about 2 to 10 weight per cent; passing remaining condensed overhead as said liquid dicyclopentadiene to storage; withdrawing from, partially depolymerizing, and returning to said storage a portion of said dicyclopentadiene sufficient to maintain a concentration of at least 2 weight per cent cyclopentadiene therein.

4. A process according to claim 3 in which said portion of said condensed dicyclopentadiene from said fractionation and said portion from the storage is heated between about 300 to 400° F. for from 5 to 20 minutes to effect said partial depolymerization.

5. In a process for separating and storing non-contaminated liquid dicyclopentadiene in which said dicyclopentadiene is fractionally recovered from impurities and liquefied in admixture with a minor amount of cyclopentadiene, the improvement which comprises introducing the mixture of dicyclopentadiene and cyclopentadiene into a storage tank, continuously withdrawing a relatively small portion of said mixture, partially depolymerizing said withdrawn portion, cooling and returning said treated portion to said tank in an amount sufficient to maintain the concentration of cyclopentadiene therein between about 2 and 10 weight per cent.

ADOLPH J. WISS.

REFERENCES CITED

The following references are of record in the file of this patent:

UNITED STATES PATENTS

| Number | Name | Date |
|---|---|---|
| 2,211,038 | Ward | Aug. 13, 1940 |
| 2,362,227 | Wells | Nov. 7, 1944 |
| 2,414,651 | Latchum, Jr. | Jan. 21, 1947 |

FOREIGN PATENTS

| Number | Country | Date |
|---|---|---|
| 557,339 | Great Britain | Nov. 16, 1943 |

OTHER REFERENCES

Barrett et al.: Jour. of Physical Chemistry, vol. 37, 1029–35.

Stobbe et al.: Annalen, vol. 391, 151–168 (1912).

Etard et al.: Compte rendu, vol. 112, 945–7 (1891).